I. W. Hamlet.
Neck-Tie.

N° 58168. Patented Sept. 18. 1866.

Witnesses.
Samuel N. Piper.
F. Curtis.

Inventor:
Ira W. Hamlet.
by his attorney.
R. H. Eddy.

UNITED STATES PATENT OFFICE.

IRA W. HAMLET, OF NASHUA, NEW HAMPSHIRE, ASSIGNOR TO HIMSELF AND HENRY J. CHAPMAN, OF SAME PLACE.

IMPROVEMENT IN NECK-TIES.

Specification forming part of Letters Patent No. 58,168, dated September 18, 1866.

*To all whom it may concern:*

Be it known that I, IRA W. HAMLET, of Nashua, in the county of Hillsborough and State of New Hampshire, have invented a new and useful Improvement in Cravats or Neck-Ties; and I do hereby declare the same to be fully described in the following specification, and represented in the accompanying drawings, of which—

Figure 1:
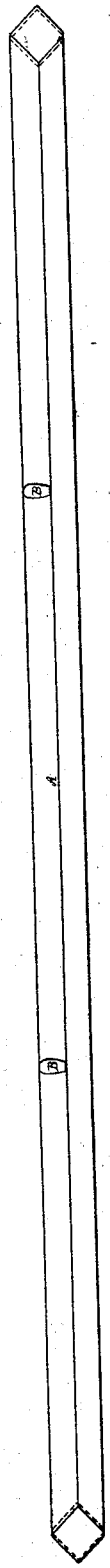
Figure 4:
Figure 3:
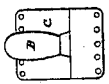
Figure 2:

Figure 1 is a rear view, and Fig. 2 a transverse section, of one of my improved cravats or neck-ties. Fig. 3 is a side view of the cravat hook and stretcher, and Fig. 4 is an edge view of such.

The purpose of my invention is to cause a cravat to remain in place or prevent it from rising on the collar of the shirt while in use.

In the drawings, A denotes a common cravat or "Napoleon tie." B B are two hooks fastened in or to the cravat, to project from its inner side, they being so arranged as to hook underneath the lower edge of the collar when it is encompassed by the cravat. They serve to keep the cravat from rising or working upward on the collar, so as to expose the button by which the front parts of the collar are fixed to the shirt.

The collar, under such circumstances, is supposed to be what is termed a "false collar"— that is, one not sewed to the shirt; but when when the collar is sewed to or inseparable from the shirt, there may be small holes wrought in or loops applied to it to receive the hooks. One hook will sometimes answer; but I prefer two, as by means of such the cravat or neck-tie is supported to better advantage.

I also prefer to project the hook from a strong plate, as represented in Figs. 3 and 4, in which the hook is shown at B, and the plate at C, such also being exhibited in Fig. 3. The plate is placed within the cravat, and extends from one edge to the other of it, and serves as a stiffener to prevent it from breaking down or becoming wrinkled.

In Figs. 3 and 4 the plate and the hook are exhibited as made from one piece of metal.

Holes may be made through the supporting-plate of the hook to enable it to be sewed to the cravat.

I claim—

1. The new manufacture or neck-tie as made with hooks B B, applied to and arranged with the part or cravat A, substantially as set forth.

2. The combination of the hook B, the cravat A, and the stiffener or plate C.

3. The combination of the cravat hook and stiffener, the same being for the purpose set forth.

IRA W. HAMLET.

Witnesses:
R. H. EDDY,
F. P. HALE, Jr.